United States Patent
Zhao et al.

(10) Patent No.: US 9,858,889 B2
(45) Date of Patent: Jan. 2, 2018

(54) COLOR COMPENSATION CIRCUIT, DISPLAY APPARATUS, AND COLOR COMPENSATION METHOD

(71) Applicant: BOE TECHNOLOGY GROUP CO., LTD., Beijing (CN)

(72) Inventors: Tianyue Zhao, Beijing (CN); Lijie Zhang, Beijing (CN); Xitong Ma, Beijing (CN); Yanfu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/094,277

(22) Filed: Apr. 8, 2016

(65) Prior Publication Data
US 2017/0039991 A1    Feb. 9, 2017

(30) Foreign Application Priority Data

Aug. 6, 2015  (CN) .......................... 2015 1 0478093

(51) Int. Cl.
  *G09G 5/02*    (2006.01)
  *H04N 9/64*   (2006.01)
  *H04N 1/64*   (2006.01)

(52) U.S. Cl.
  CPC ............... *G09G 5/02* (2013.01); *H04N 1/646* (2013.01); *H04N 9/64* (2013.01); *G09G 2320/0666* (2013.01); *G09G 2340/02* (2013.01)

(58) Field of Classification Search
  CPC ........ G09G 5/02; G09G 2340/02; H04N 9/64; H04N 9/78; H04N 9/793; H04N 9/832; H04N 9/8722; H04N 19/70; H04N 19/80
  See application file for complete search history.

(56) References Cited

U.S. PATENT DOCUMENTS 7,446,774 B1 * 11/2008  MacInnis ................ G06T 9/007
                                                                  345/519

FOREIGN PATENT DOCUMENTS

| CN | 1754189 A | 3/2006 |
|---|---|---|
| CN | 1997165 A | 7/2007 |
| CN | 101924950 A | 12/2010 |
| CN | 103000145 A | 3/2013 |
| JP | 2013-239789 A | 11/2013 |

OTHER PUBLICATIONS

Office Action from corresponding Chinese Application No. 201510478093.3 (7 pages), dated Oct. 14, 2016.

* cited by examiner

*Primary Examiner* — Antonio A Caschera
(74) *Attorney, Agent, or Firm* — Harness, Dickey & Pierce, P.L.C.

(57) ABSTRACT

A color compensation circuit comprises an acquisition unit for acquiring, from a video signal, gray image of a frame to be displayed and chrominance image of any color; wherein a chrominance value in the video signal, corresponding to at least a portion of pixels within the chrominance image, is absent; a processing unit for smoothly processing the chrominance value in the chrominance image according to the change trend of gray value in the gray image to obtain a chrominance image with color compensated. The present disclosure can solve the problem that compression and decompression of a video signal during transmission will significantly decrease the frame display effect, and thereby helping improve the frame display effect in a transmission scenario with the loss of chrominance value of the video signal.

15 Claims, 2 Drawing Sheets

401 — acquiring, from a video signal, gray image of a frame to be displayed and chrominance image of any color 402 — smoothly processing the chrominance value in the chrominance image according to the change trend of gray value in the gray image to obtain a chrominance image with color compensated

COLOR COMPENSATION CIRCUIT, DISPLAY APPARATUS, AND COLOR COMPENSATION METHOD

CROSS-REFERENCE TO RELATED APPLICATION

This application claims the benefit and priority of Chinese Patent Application No. 201510478093.3 filed Aug. 6, 2015. The entire disclosure of the above application is incorporated herein by reference.

TECHNICAL FIELD

The present disclosure relates to the display technical field, and specifically, to a color compensation circuit, a display apparatus, and a color compensation method.

BACKGROUND

This section provides background information related to the present disclosure which is not necessarily prior art.

In the prior art, YUV manner is mainly used for optimizing the transmission of color video signals. Compared with RGB manner, YUV manner only uses very little bandwidth, since the RGB manner requires the simultaneous transmission of three separate video signals, while the YUV manner doesn't. Wherein, "Y" represents Luminance (or Luma), i.e., a gray value; while "U" and "V" represent Chrominance (or Chroma), which act to describe image color and saturation and are used to specify color of pixel.

To transmit a greater amount of data in a limited bandwidth, such as 4K video, 6K pictures, etc., in the prior art, YUV data at 4:4:4 are often compressed first to YUV data at 4:2:2 (in the meantime, chrominance value information will be compressed to half of the original), and then decompressed after the transmission, so as to complete the display of the frame. Specifically, due to the lack of half of chrominance value information, common decompress manners will copy the existing half of chrominance value information and fill it into the frame. Therefore, the decompress manners abovementioned will cause the loss of half of chrominance value information of the frame, and directly reflect it on the display frame, significantly decreasing the display effect of the frame.

SUMMARY

This section provides a general summary of the disclosure, and is not a comprehensive disclosure of its full scope or all of its features.

With respect to deficiencies in the prior art, the present disclosure provides a color compensation method, a color compensation circuit, and a display apparatus, which can solve the problem that compression and decompression of video signals during transmission will significantly decrease the frame display effect.

A first aspect of the present disclosure provides a color compensation circuit, comprising:

an acquisition unit for acquiring, from a video signal, gray image of a frame to be displayed and chrominance image of any color; wherein a chrominance value in the video signal, corresponding to at least a portion of pixels within the chrominance image, is absent; and a processing unit for smoothly processing the chrominance value in the chrominance image according to the change trend of gray value in the gray image to obtain a chrominance image with color compensated.

Optionally, the processing unit comprises:

a computation module for computing the gray image acquired by the acquisition unit within a plurality of image regions having a preset size to obtain a plurality of weight matrices corresponding to each of the image regions; wherein any of the weight matrices comprises a weight corresponding to each pixel in the image regions, for representing a change amount and change trend of gray value gradient within this image region; and a convolution module for convoluting, in the chrominance image acquired by the acquisition unit, a chrominance value matrix within each of the image regions with a corresponding weight matrix, to obtain a chrominance image with color compensated.

Optionally, the convolution operation is:

$$U'=U \times S+b;$$

wherein, U' is a chrominance value of a center pixel within any of the image regions in the chrominance image with color compensated, U is a chrominance value matrix within this image region in the chrominance image before color compensation, S is the weight matrix corresponding to this image region, and b is preset difference compensation data.

Optionally, any of the image regions comprises an edge feature pixel of at least one of the gray image.

Optionally, the circuit further comprises:

a restoring unit for restoring the frame to be displayed according to the gray image acquired by the acquisition unit and the chrominance image with color compensated acquired by the processing unit.

A second aspect of the present disclosure further provides a color compensation method, comprising:

acquiring, from a video signal, gray image of a frame to be displayed and chrominance image of any color; wherein a chrominance value in the video signal, corresponding to at least a portion of pixels within the chrominance image, is absent; and smoothly processing the chrominance value in the chrominance image according to the change trend of gray value in the gray image to obtain a chrominance image with color compensated.

Optionally, the smoothly processing the chrominance value in the chrominance image according to the change trend of gray value in the gray image to obtain a chrominance image with color compensated, comprises:

computing the gray image within a plurality of image regions having a preset size to obtain a plurality of weight matrices corresponding to each of the image regions; wherein any of the weight matrices comprises a weight corresponding to each pixel in the image regions, for representing a change amount and change trend of gray value gradient within this image region; and convoluting, in the chrominance image, a chrominance value matrix within each of the image regions with a corresponding weight matrix, to obtain a chrominance image with color compensated.

Optionally, the convolution operation is:

$$U'=U \times S+b;$$

wherein, U' is a chrominance value of a center pixel within any of the image regions in the chrominance image with color compensated, U is a chrominance value matrix within this image region in the chrominance image before color compensation, S is the weight matrix corresponding to this image region, and b is preset difference compensation data.

Optionally, any of the image regions comprises an edge feature pixel of at least one of the gray image.

Optionally, the method further comprises:

restoring the frame to be displayed according to the gray image and the chrominance image with color compensated.

A third aspect of the present disclosure further provides a display apparatus, comprising the color compensation circuit abovementioned.

The present disclosure may utilize a gray image with sufficient image details to smoothly process a chrominance image with the lack of image details. Therefore, compared to that without smooth processing, the chrominance image has richer details and the details may comply with the change trend of gray value in the gray image, whereby a better display effect may be acquired when the display frame is formed. The present disclosure can solve the problem that compression and decompression of a video signal during transmission will significantly decrease the frame display effect, thereby helping improve the frame display effect when a chrominance value of the video signal is lost.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In the description of the present disclosure, it should be noted that the orientation or position relation indicated by terms "upper", "lower" and the like is an orientation or position relation shown based on the accompanying drawings, merely used for facilitating and simplifying the description of the present disclosure, instead of indicating or implying that the device or element referred to must have a particular orientation or be constructed and operated in a particular orientation, and therefore cannot be construed as limiting the present disclosure.

Unless otherwise clearly specified and defined, the terms "mounted", "attached", "connected" shall be broadly understood, for example, may be fixedly connected, and also may be removably connected or integrally connected; may be mechanically connected, and also may be electrically connected; may be directly connected, also may be indirectly connected through an intermediate medium, and may be internally connected in two elements. Those of ordinary skill in the art may understand specific meanings of the terms abovementioned in the present disclosure according to specific situations.

Figure 1:
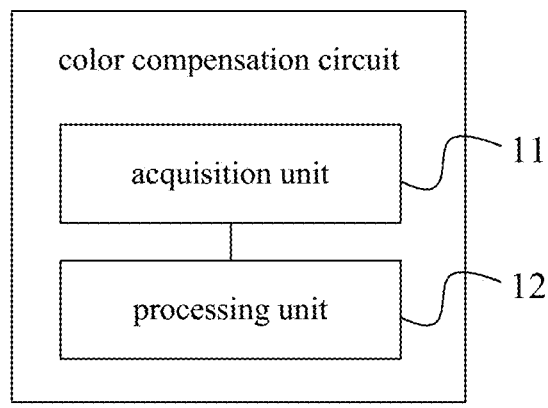
FIG. 1 is a structural block diagram of a color compensation circuit in according to one embodiment of the present disclosure.

FIG. 1 is a structural block diagram of a color compensation circuit in according to one embodiment of the present disclosure. Referring to FIG. 1, the color compensation circuit comprises:

an acquisition unit 11 for acquiring, from a video signal, gray image of a frame to be displayed and chrominance image of any color. Wherein, a chrominance value in the video signal, corresponding to at least a portion of pixels within the chrominance image, is absent.

a processing unit 12 for smoothly processing the chrominance value in the chrominance image according to the change trend of gray value in the gray image to obtain a chrominance image with color compensated.

The processing unit 12 may receive the gray image and chrominance image from the acquisition unit 11, and therefore can be connected through a corresponding manner. The video signal abovementioned may comprise image data of at least one frame to be displayed, and image data may comprise gray channel data and chrominance channel data of at least one color. In one embodiment of the present disclosure, the acquisition unit 11 may obtain the gray image by extracting gray channel data of one frame to be displayed, and may obtain the chrominance image by extracting chrominance channel data of one color of the display frame. Wherein, the gray image and chrominance image may be a data set, in any form. The gray image and chrominance image may be set by those skilled in the art according to the form required by the processing unit 12 during processing, and the present disclosure will not limit it.

As an example of the absence of the chrominance value in a video signal, the video signal may be in YUV data format at 4:2:2. Specifically, in this data format, the sampling rate of chrominance channel data is half of gray channel data. For example, data corresponding to four pixels is respectively as follows: [Y0 U0 V0], [Y1 U1 V1], [Y2 U2 V2] and [Y3 U3 V3]. Then code streams stored in the video signal are: Y0 U0 Y1 V1 Y2 U2 Y3 V3. The data corresponding to the four pixels in the image obtained according to the video signal is respectively as follows: [Y0 U0 V1], [Y1 U0 V1], [Y2 U2 V3] and [Y3 U2 V3]. Therefore, chrominance values U1 and U3 in the video signal corresponding to two pixels within the U chrominance image are absent, and chrominance values V0 and V2 in the video signal corresponding to two pixels within the V chrominance image are absent.

Accordingly, when the video signal is in the YUV data format at 4:2:2, both the U chrominance image and the V chrominance image lose half of chrominance value information. Thus, it appears that one image is stretched to double size, whereby the display effect is inevitably decreased when the display frame is formed.

In this regard, based on the change trend of gray value in the gray image, the processing means 12 may smoothly process the U chrominance image or V chrominance image, i.e., conduct color compensation. For example, for the data corresponding to the four pixels in the image acquired from the video signal: [Y0 U0 V1], [Y1 U0 V1], [Y2 U2 V3] and [Y3 U2 V3], U0, U0, U2, U2 in the U chrominance image may be smoothly processed into U0', U1', U2', U3' through an existing algorithm according to the change trend of Y0, Y1, Y2, Y3. V1, V1, V3, V3 in the V chrominance image may be smoothly processed into V0', V1', V2', V3'. Of course, considering the way of arrangement of pixels in two-dimensional images, one pixel may be smoothly processed as abovementioned based on relevant data of all the neighbor pixels.

Compared to that without the smoothing processing, the chrominance image has richer details, and the details may comply with the change trend of gray value in the gray image, and therefore may have a better display effect when the display frame is formed. Therefore, the color compensation circuit provided in the embodiment of the present disclosure can solve the problem that compression and decompression of a video signal during transmission will significantly decrease the frame display effect, thereby helping improve the frame display effect in a transmission scenario when a chrominance value of the video signal is lost.

In the prior art, chrominance channel data in the YUV data format is color difference data, i.e., the difference between base color data and gray data. Meanwhile, since the green component contributes most to the gray value, the value of color difference of the green color is relatively small. Apparently, the transmission of a small signal in the signal transmission process is unfavorable to the improvement of signal to noise ratio, whereby two chrominance channel data in the YUV data format is divided into red color difference data and blue color difference data, while green color difference data may be calculated from red color difference data and blue color difference data. Thus, when acquiring from the video signal the chrominance image of red or blue color of the frame to be displayed, the acquisition unit 11 may calculate the red color difference data or blue color difference data in the video signal as well as the gray channel data.

Of course, in addition to the video signal in the YUV data format, color compensation may be conducted with reference to the process abovementioned for any video signal with the loss of chrominance value information, and the present disclosure has no limitation thereon.

Figure 2:
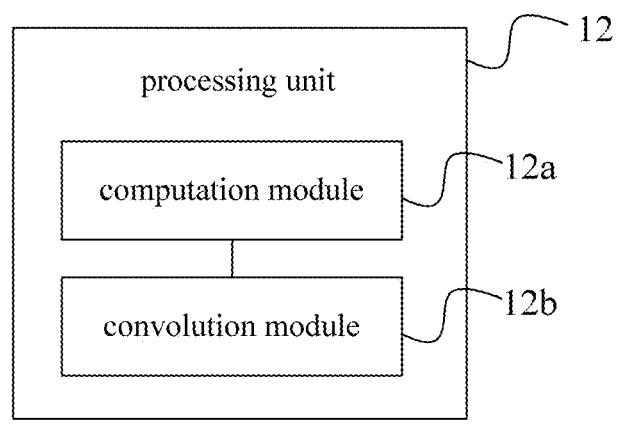
FIG. 2 is a structural block diagram of a processing unit in according to one embodiment of the present disclosure.

As a more specific example, FIG. 2 is a structural block diagram of a processing unit in according to one embodiment of the present disclosure. Referring to FIG. 2, the processing unit 12 may comprise specifically a computation module 12a and a convolution module 12b.

The computation module 12a is for computing the gray image acquired by the acquisition unit 11 within a plurality of image regions having a preset size to obtain a plurality of weight matrices corresponding to each of the image regions. And, wherein any of the weight matrices comprises a weight corresponding to each pixel in the image regions, for representing a change amount and change trend of gray value gradient within this image region.

A convolution module 12b is for convoluting, in the chrominance image acquired by the acquisition unit 11, a chrominance value matrix within each of the image regions with a corresponding weight matrix, to obtain a chrominance image with color compensated.

It need to be noted that, since a convolution operation requires an odd number of pixels in an image region of each row and each column, each image region has a unique center pixel. Since a result of a convolution operation corresponds to a center pixel of an image region, pixels, chrominance values of which need to be adjusted, could be determined according to the application scenario, to thereby obtain a plurality of image regions centered on these pixels.

Figures 3, 4:
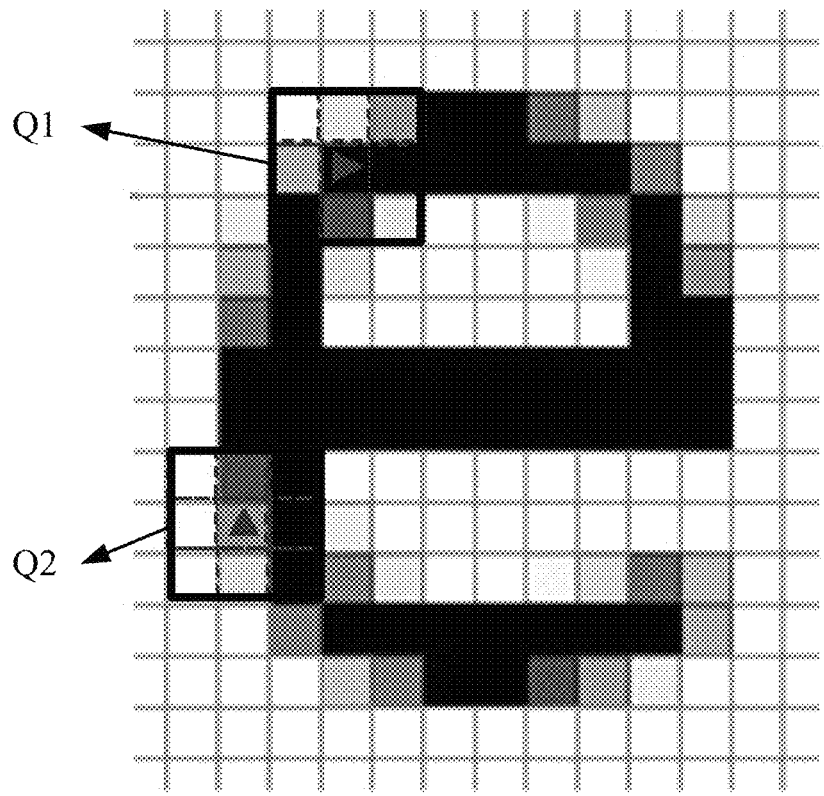
FIG. 3 is a schematic principle diagram of smooth processing in according to one embodiment of the present disclosure.
FIG. 4 is a schematic process flowchart of a color compensation method in according to one embodiment of the present disclosure.

For example, FIG. 3 is a schematic principle diagram of smooth processing in according to one embodiment of the present disclosure. Referring to a portion of an image to be displayed shown in FIG. 3, both the image region Q1 and image region Q2 have a preset size of 3×3 pixels, and the center pixels are indicated by triangles. For the image region Q1 of the gray image abovementioned, the computation module 12a may compute a 3×3 weight matrix composed of the weights corresponding to the nine pixels in the image region Q1. Thus, in the image region Q1 of the chrominance image abovementioned, the convolution module 12b may convolute the 3×3 chrominance value matrix with the weighting matrix, to thereby obtain chrominance values with updated center pixel. Specifically, the convolution operation may be conducted in accordance with the following formula:

$$U'=U \times S+b;$$

wherein, U' is a chrominance value of a center pixel within any of the image regions in the chrominance image with color compensated, U is a chrominance value matrix within this image region in the chrominance image before color compensation, S is the weight matrix corresponding to this image region, and b is preset difference compensation data.

Referring to FIG. 3, the change amount and change trend of gray value among the nine pixels in FIG. 3 may be fitted to the chrominance value distribution of the nine pixels in a preset way, so that the image region Q1 also has a change amount and change region as shown in FIG. 3. For example, the gray value distribution as shown in the image region Q1 is a substantially vertical distribution, while the gray value distribution as shown in the image regions Q2 is a substantially horizontal distribution. Thus, after the completion of updating chrominance values of all the pixels to be processed, the color compensation to the chrominance image may be completed.

Compared with other smoothing processing manners, the convolution operation can complete the processing of a two-dimensional image in a manner similar to image filtering, with a small amount of computations and high flexibility, and is easily implemented through a corresponding circuit or a program. Of course, there are a variety of existing smoothing processing and convolution operations, from which those skilled in the art may select with reference to the prior art, and the present disclosure has no limitation thereon.

In addition, considering the possible presence of a relatively large area of a region with uniform gray value in the gray image, color compensation to the chrominance image for this region may not be required. Whereby during the selection of a plurality of said image regions, filtering may be conducted based on an edge feature of the gray image, i.e., any of the image regions abovementioned may comprise at least one edge feature pixel of said gray image. For example, in the selection of the plurality of image regions, an edge feature may be extracted from the gray image, and then all regions comprising at least one edge feature pixel and having a preset size are defined as the plurality of image regions. Therefore, the color compensation processing abovementioned may be conducted only for the edge feature in the image to be displayed while other portions of the image are not processed, thereby resulting in fewer amounts of computation and high efficiency.

On the basis of any of the color compensation circuit abovementioned, a restoring unit not shown in the drawings may also be comprised. The restoring unit is used for restoring the frame to be displayed according to the gray image acquired by the acquisition unit 11 and the chrominance image acquired by the processing unit 12 with all colors compensated. For example, when the video signal abovementioned is in a YUV data format at 4:2:2, the acquisition unit 11 can obtain a gray image of the frame to be displayed, while the restoring unit may obtain a red chrominance image and blue chrominance image with color compensated, whereby a green chrominance image may be computed according to these images and the frame to be displayed may be acquired by superimposing all the chrominance images and gray images. It could be understood that, after the above processing procedure, the frame to be displayed may have more delicate colors, thereby helping improve the display effect.

Based on the same inventive concept, the embodiment of the disclosure provides a display apparatus. The display apparatus comprises the color compensation circuit abovementioned. For example, in the prior art, a video signal input terminal of the display apparatus is directly connected to a display drive circuit. And in the display apparatus of the embodiment of the present disclosure, the color compensation circuit may be provided between the video signal input terminal and the display driver circuit, thereby improving the display effect. It needs to be noted that the display apparatus in the present embodiment may be any product or component having a display function, such as a display panel, electronic paper, a mobile phone, a tablet computer, a television, a notebook computer, a digital picture frame, a navigation systems, etc. and other products.

Based on the same inventive concept, FIG. 4 is a schematic process flowchart of a color compensation method in according to one embodiment of the present disclosure. Referring to FIG. 4, the method comprises step 401 and step 402.

Step 401 comprises acquiring, from a video signal, gray image of a frame to be displayed and chrominance image of any color. Wherein a chrominance value in the video signal, corresponds to at least a portion of pixels within the chrominance image, is absent.

Step 402 comprises smoothly processing the chrominance value in the chrominance image according to the change trend of gray value in the gray image to obtain a chrominance image with color compensated.

The step 401 and step 402 may execute the functions of any of the acquisition unit 11 and any of the processing unit 12, thereby having specific corresponding processes, which are not described herein any more.

As can be seen, the embodiment of the disclosure may utilize a gray image with sufficient image details to smoothly process a chrominance image with few image details, whereby compared to that without the smooth processing, the chrominance image has richer details, which details may comply with the change trend of gray value in the gray image, thereby having a better display effect when forming the frame to be displayed. As it can be seen, the embodiment of the disclosure can solve the problem that compression and decompression of the video signal during transmission will significantly decrease the frame display effect, thereby helping improve the frame display effect in a transmission scenario when a chrominance value of the video signal is lost.

As an example, the abovementioned step 402 of smoothly processing the chrominance value in the chrominance image according to the change trend of gray value in the gray image to obtain a chrominance image with color compensated, may specifically comprise step 402a, and step 402b, which are not shown in the drawings.

Step 402a comprises computing the gray image within a plurality of image regions having a preset size to obtain a plurality of weight matrices corresponding to each of the image regions. Wherein any of the weight matrices comprises a weight corresponding to each pixel in the image regions, for representing a change amount and change trend of gray value gradient within this image region.

Step 402b comprises convoluting, in the chrominance image, a chrominance value matrix within each of the image regions with a corresponding weight matrix, to obtain a chrominance image with color compensated.

As an example, the convolution operation abovementioned may be conducted in accordance with the following formula:

$$U'=U \times S+b;$$

wherein, U' is a chrominance value of a center pixel within any of the image regions in the chrominance image with color compensated, U is a chrominance value matrix within this image region in the chrominance image before color compensation, S is the weight matrix corresponding to this image region, and b is preset difference compensation data.

The step 402a and step 402b may execute the functions of any of the computation module 12a and any of the convolution module 12b, thereby having specific corresponding processes, which are not described herein any more.

In addition, considering the possible presence of a relatively large area of a region with uniform gray value in the gray image, color compensation to the chrominance image for this region may not be required, whereby during the selection of a plurality of said image regions, filtering may be conducted based on an edge feature of the gray image, i.e., any of the image regions abovementioned may comprise at least one edge feature pixel of said gray image. For example, in the selection of the plurality of image regions, an edge feature may be extracted from the gray image, and then all regions comprising at least one edge feature pixel and having a preset size are defined as the plurality of image regions. Therefore, the color compensation processing abovementioned may be conducted only for the edge feature in the image to be displayed while other portions of the image are not processed, thereby resulting in fewer amounts of computation and high efficiency.

On the basis of any of the color compensation method abovementioned, the following steps now shown in the drawings may also be comprised:

step 403 of restoring the frame to be displayed according to the gray image and the chrominance image with all colors compensated.

For example, when the video signal abovementioned is in a YUV data format at 4:2:2, the acquisition unit 11 can obtain a gray image of the frame to be displayed, while the restoring unit may obtain a red chrominance image and blue chrominance image with color compensated, whereby a green chrominance image may be computed according to these images and the frame to be displayed may be acquired by superimposing all the chrominance images and gray images. It could be understood that, after the above processing procedure, the frame to be displayed may have more delicate colors, thereby helping improve the display effect.

Numerous specific details are described in the description of the present disclosure. However, it can be understood that the embodiment of the present disclosure may be practiced without these specific details. In some instances, well-known methods, structures and techniques are not shown in detail, so as not to obscure the understanding of this description.

Similarly, it should be understood that, to simplify the disclosure of the present disclosure and help to understand one or more of various aspects of the disclosure, in the description of exemplary embodiments of the present disclosure above, the various features of the disclosure are sometimes grouped together into a single embodiment, drawing, or description thereof. However, the disclosed method should not be construed to reflect the following intention that the claimed disclosure requires more features than those explicitly set forth in each claim. More definitely, as reflected in the following claims, inventive aspects lie in less than all features of a single embodiment foregoing disclosed. Thus, the claims following the specific embodiment thus are explicitly incorporated into this specific embodiment, wherein each claim itself acts as a separate embodiment of the present disclosure.

Those skilled in the art may appreciate that the modules in the device in the embodiment may be adaptively modified and provided in one or more devices different from this embodiment. Modules or units or components in the embodiment may be combined into one module or unit or module, and furthermore may be divided into a plurality of sub-modules or sub-units or sub-components. In addition that at least some of such features and/or processes or units are mutually exclusive, any combination may be used to combine all features disclosed in the description (comprising the accompanying claims, abstract and drawings) as well as all process or units of any such disclosed method or device. Unless explicitly stated otherwise, each feature disclosed in this description (comprising the accompanying claims, abstract and drawings) may be substituted by an alternative feature that provides a same, equivalent or similar purpose.

Moreover, those skilled in the art can appreciate that although some embodiments described herein comprise some features comprised in other embodiments, rather than other features, combinations of features of different embodiments are meant to be in the scope of the present disclosure and to form different embodiments. For example, in the following claims, any of the claimed embodiments may be used in any of the combinations.

Embodiments of various components of the present disclosure may be implemented in hardware or in software modules running on one or more processors, or in a combination thereof. Those skilled in the art should appreciate that a microprocessor or digital signal processor (DSP) may be used in practice to implement some or all of functions of some or all of components in devices of a browser terminal according to the embodiment of the present disclosure. The present disclosure may also be implemented as an apparatus or apparatus program (e.g. computer program and computer program products) for executing part or all of the method described herein. Such program implementing the present disclosure may be stored on a computer readable medium, or may have one or more forms of signals. Such signals may be downloaded from the Internet website, or provided on a carrier signal, or provided in any other form.

It should be noted that the above embodiment is to describe rather than limit the disclosure, and that those skilled in the art may devise alternative embodiments without departing from the scope of the appended claims. In the claims, any reference sign within parentheses should not be formed to limit the claims. The word "comprising" does not exclude the presence of elements or steps not listed in the claims. The word "a" or "an" located before elements does not exclude the presence of a plurality of such elements. The present disclosure may be implemented by means of hardware comprising a plurality of distinct elements, and by means of a computer suitably programmed. In the unit claims listing a plurality of means, a plurality of these means may be specifically embodied by the same hardware item. The use of words first, second, and third, etc. does not denote any order. These words can be interpreted as names.

Finally, it should be noted that: the embodiments above-mentioned are merely provided to describe, but not intended to limit, the technical solution of the present disclosure; although the present disclosure has been described in detail with reference to the foregoing embodiments, those of ordinary skill in the art should appreciate that they may modify the technical solution disclosed in the foregoing embodiments, or perform equivalent substitutions on part or all of the technical features therein. Such modifications or substitutions do not make the essence of the corresponding technical solution depart from the scope of the technical solution of various embodiments of the disclosure, but should be encompassed within the scope of the claims and description of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A color compensation circuit, comprising:
an acquisition unit for acquiring, from a video signal, a gray image of a frame to be displayed and a chrominance image of any color, wherein a chrominance value in the video signal corresponding to at least a portion of pixels within the chrominance image is absent; and
a processing unit for smoothly processing the chrominance value in the chrominance image according to a change trend of a gray value in the gray image to obtain a color compensated chrominance image, the processing unit including:
a computation module for computing the gray image acquired by the acquisition unit within a plurality of image regions having a preset size to obtain a plurality of weight matrices corresponding to each of the image regions, wherein any of the weight matrices comprises a weight corresponding to each pixel in the image regions, for representing a change amount and a change trend of gray value gradient within this image region; and
a convolution module for convoluting, in the chrominance image acquired by the acquisition unit, a chrominance value matrix within each of the image regions with a corresponding weight matrix to obtain the color compensated chrominance image.

2. The circuit according to claim 1, wherein the convolution operation is:

$$U' = U \times S + b;$$

where U' is a chrominance value of a center pixel within any of the image regions in the color compensated chrominance image, U is a chrominance value matrix within this image region in the chrominance image before color compensation, S is the weight matrix corresponding to this image region, and b is preset difference compensation data.

3. The circuit according to claim 2, further comprising:
a restoring unit for restoring the frame to be displayed according to the gray image acquired by the acquisition unit and the color compensated chrominance image acquired by the processing unit.

4. A display apparatus comprising the color compensation circuit of claim 2.

5. The circuit according to claim 1, wherein any of the image regions comprises an edge feature pixel of the gray image.

6. The circuit according to claim 5, further comprising:
a restoring unit for restoring the frame to be displayed according to the gray image acquired by the acquisition unit and the color compensated chrominance image acquired by the processing unit.

7. A display apparatus comprising the color compensation circuit of claim 5.

8. The circuit according to claim 1, further comprising:
a restoring unit for restoring the frame to be displayed according to the gray image acquired by the acquisition unit and the color compensated chrominance image acquired by the processing unit.

9. A display apparatus comprising the color compensation circuit of claim 1.

10. A color compensation method performed by the color compensation circuit of claim 1, the method comprising:
acquiring, from a video signal, a gray image of a frame to be displayed and a chrominance image of any color, wherein a chrominance value in the video signal corresponding to at least a portion of pixels within the chrominance image is absent; and
smoothly processing the chrominance value in the chrominance image according to the change trend of gray value in the gray image to obtain a color compensated chrominance image, by:
computing the gray image within a plurality of image regions having a preset size to obtain a plurality of weight matrices corresponding to each of the image regions, wherein any of the weight matrices comprises a weight corresponding to each pixel in the image regions, for representing a change amount and a change trend of gray value gradient within this image region; and
convoluting, in the chrominance image, a chrominance value matrix within each of the image regions with a corresponding weight matrix, to obtain the color compensated chrominance image.

11. The method according to claim 10, wherein the convolution operation is:

$$U'=U \times S+b;$$

where U' is a chrominance value of a center pixel within any of the image regions in the color compensated chrominance image, U is a chrominance value matrix within this image region in the chrominance image before color compensation, S is the weight matrix corresponding to this image region, and b is preset difference compensation data.

12. The method according to claim 11, characterized in that the method further comprises:
restoring the frame to be displayed according to the gray image and the color compensated chrominance image.

13. The method according to claim 10, wherein any of the image regions comprises an edge feature pixel of the gray image.

14. The method according to claim 13, characterized in that the method further comprises:
restoring the frame to be displayed according to the gray image and the color compensated chrominance image.

15. The method according to claim 10, further comprising:
restoring the frame to be displayed according to the gray image and the color compensated chrominance image.

* * * * *